United States Patent [19]
Lajoie

[11] Patent Number: 6,021,597
[45] Date of Patent: Feb. 8, 2000

[54] ROD CONNECTOR

[76] Inventor: Timothy P. Lajoie, 46 State Rd., Baldwinville, Mass. 01436

[21] Appl. No.: 08/686,278

[22] Filed: Jul. 25, 1996

Related U.S. Application Data

[63] Continuation of application No. PCT/US95/09421, Jul. 25, 1995, which is a continuation-in-part of application No. 08/279,564, Jul. 25, 1994.

[51] Int. Cl.[7] .................................................. A01K 87/00
[52] U.S. Cl. ................................................................. 43/25
[58] Field of Search ............................... 43/25, 25.2, 26, 43/21.2, 54.1, 57.1; 211/70.8; 206/315.11; 24/336, 306, 304; 224/922

[56] References Cited

U.S. PATENT DOCUMENTS

| | | |
|---|---|---|
| 396,909 | 1/1889 | Annin . |
| 751,930 | 2/1904 | Lundgren . |
| 2,144,122 | 1/1939 | Pflueger ........................................ 43/25 |
| 3,113,363 | 12/1963 | Fyvie ........................................ 24/257 |
| 3,169,290 | 2/1965 | Snodgrass ..................................... 24/81 |
| 3,251,069 | 5/1966 | Clark ....................................... 248/74.3 |
| 3,292,298 | 12/1966 | Mullikin ..................................... 43/21.2 |
| 3,319,910 | 5/1967 | Collin et al. ................................. 43/21.2 |
| 3,508,357 | 4/1970 | Collin et al. ................................. 43/21.2 |
| 3,516,191 | 6/1970 | Baenziger ..................................... 43/25 |
| 3,516,631 | 6/1970 | Santucci .................................. 248/74.3 |
| 3,665,635 | 5/1972 | Lumbard ................................... 43/25.2 |
| 3,832,796 | 9/1974 | Cardwell et al. ............................. 43/25 |
| 3,863,381 | 2/1975 | Ladany .......................................... 43/25 |
| 3,947,141 | 3/1976 | Casset ....................................... 403/109 |
| 3,992,799 | 11/1976 | Oakes ........................................... 43/25 |
| 4,002,349 | 1/1977 | Dopp .................................... 280/11.37 |
| 4,120,437 | 10/1978 | Hara ....................................... 224/45 S |
| 4,265,046 | 5/1981 | Keith ........................................ 43/21.2 |
| 4,707,892 | 11/1987 | Nelson ...................................... 24/336 |
| 4,726,140 | 2/1988 | Mears ........................................... 43/25 |
| 4,768,303 | 9/1988 | Baylink ..................................... 43/18.1 |
| 4,780,983 | 11/1988 | Smith ....................................... 43/54.1 |
| 4,862,563 | 9/1989 | Flynn ......................................... 24/442 |
| 4,864,697 | 9/1989 | Sparks ....................................... 24/336 |
| 4,873,780 | 10/1989 | Lancette ................................... 43/25.2 |
| 5,121,526 | 6/1992 | Burkard et al. ............................ 24/336 |
| 5,214,874 | 6/1993 | Faulkner .................................. 43/25.2 |
| 5,555,607 | 9/1996 | Parveris ................................ 24/129 R |
| 5,586,404 | 12/1996 | Freitas ..................................... 43/21.2 |
| 5,598,995 | 2/1997 | Meuth et al. ........................... 248/74.3 |

Primary Examiner—Michael J. Carone
Assistant Examiner—Fredrick T. French, III
Attorney, Agent, or Firm—Sharon L. Day

[57] ABSTRACT

A connection device for a segmented pole having a line and at least a first pole section (104) and second pole section (106), such as a fishing rod, for interlocking pole pieces during use and during transport including, a first connector section (26) having a first end, a second end and a side (32), a second connector section (50) which is seated on the second piece of the pole and which has a first end, a second end and a side (58), a means for securing the first end of the first section to the second end of the second section, and a means for securing the side of the first connector section (24) to the side of the second section (56). When aligning the rod for use, the side of the first section is twisted to interlock with the side of the second connector section. When the rod pieces are separated for transport and/or storage, the rod tip piece is rotated 180° from its position when aligned and the connector sections are interconnected, for example in same manner as when a tongue is fitted into a groove. Optionally, a bottom clip is located on a non-tip rod piece and the tip end is snapped into place to secure it for transport.

14 Claims, 6 Drawing Sheets

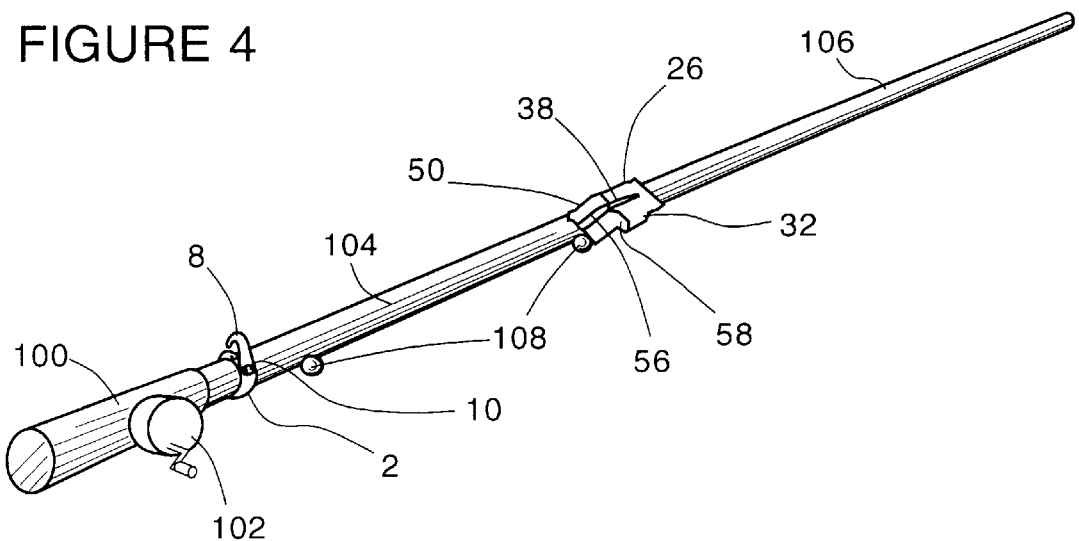
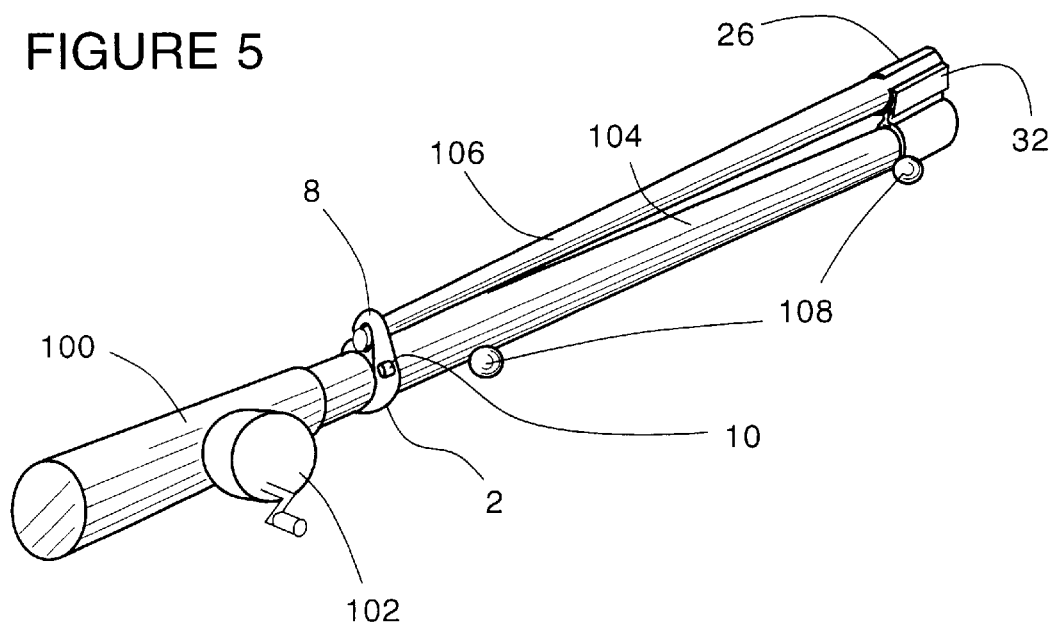

ROD CONNECTOR

This application is a continuation of PCT/US95/09421, filed Jul. 25, 1995 which is a continuation in part of U.S. patent application Ser. No. 08/279,564, filed on Jul. 25, 1994.

COPYRIGHT NOTICE

A portion of this patent document contains material which is subject to copyright protection. The copyright owner has no objection to the facsimile reproduction by anyone of the patent disclosure, as it appears in the Patent and Trademark Office patent and files or records, but otherwise reserves all copyrights whatsoever.

FIELD OF THE INVENTION

This invention relates to connectors for tapered rods.

BACKGROUND OF THE INVENTION

It is often desirable for purposes of transport and storage to make longer poles segmented. Fishing poles are the most common of such poles, but segmented long poles having lines could also be used for flag poles and portable sailing masts.

Fishing rods are usually made in two or more lengths joined by ferrules. Occasionally, the tip end of the pole will become separated during fishing, and if the line breaks, the tip end can be lost, ruining the rod.

Other difficulties with sectioned rods involve securing hooks in a safe position when handling a rod, the necessity of winding and then rethreading the line when storing and preparing the rod for use, and securing all parts of the rod together during storage and transport.

U.S. Pat. No. 396,909 discloses a ring clip for holding an extra tip end on a rod having a recessed handle.

U.S. Pat. Nos. 3,113,363 and 3,169,290 each disclose a rod clamping apparatus for organizing a disassembled rod.

U.S. Pat. No. 3,992,799, incorporated herein by reference, discloses an end clip for organizing a disassembled rod.

U.S. Pat. No. 4,768,303, incorporated herein by reference, recognizes the need for a device which would allow both side by side and end by end storage of a fishing pole. However, it suffers from certain disadvantages. The tip of the pole is not secured when the pole is folded. More importantly, attachment of the device requires permanent alterations in the ferrule of the rod, or the section ends will not fall into their original alignment since the device occupies space between the original sections. This can unbalance a rod and change the action during casting. Further, the device fails to lock the sections together, and thus does not prevent loss of the tip end of the rod.

SUMMARY OF THE INVENTION

This invention is a two or preferably three section device which aligns and locks pole sections when the pole is assembled. The pieces also hold the pole sections in a sided by side position during transport and storage. Securing the free end of a fishing line is provided, and a line guide eliminates the need for rethreading the line when the pole is reassembled. A support for resting the pole on a belt can be optionally provided.

The connection device is mounted on a pole having at least a first pole section (104) and a second pole section (106), such as a fishing pole, to interlock the pole sections end to end during use and side by side during transport and includes: a first connection section (110) having a first end, a second end and a side; a second connection section (112) having a first end, a second end and a side; means (112, 118) for securing the first end of the first section to the second end of the second section; and means (112, 118) for securing the side of the first section to the side of the second section. In one version, to align the rod for use, pole sections are twisted to interlock the first and second connector sections.

When the rod pieces are separated for storage, the rod tip is rotated 180° from its aligned position and the connector sections are interconnected in the new orientation. Optionally, a bottom clip is located on a non-tip pole piece and the tip end snapped into place to secure it for transport.

BRIEF DESCRIPTION OF THE DRAWINGS

FIG. 4 is a perspective view of the device on an assembled pole.

FIG. 5 is a perspective view of the device on a disassembled pole ready for attachment of a first rod section of a second rod section in preparation for storage of the rod.

DESCRIPTION OF THE PREFERRED EMBODIMENTS

Figure 1A:
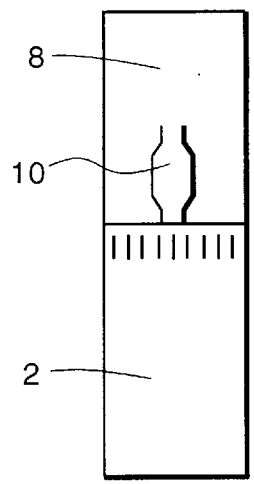
FIG. 1A is a first side view of a bottom clip.
Figure 1B:
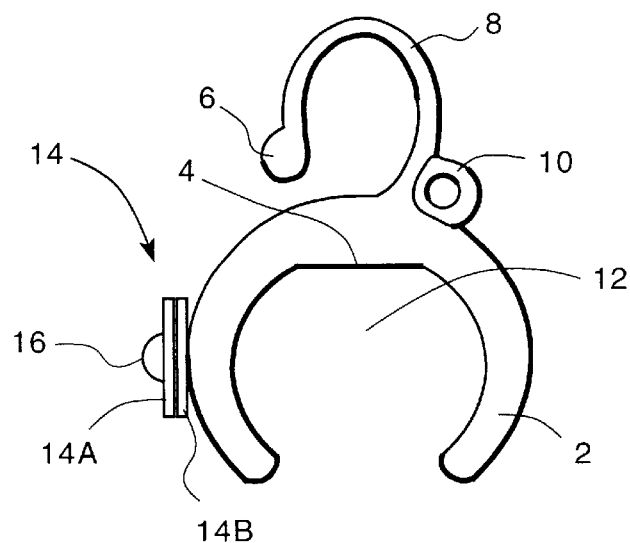
FIG. 1B is a front view of the bottom clip of FIG. 1A.
Figure 1C:
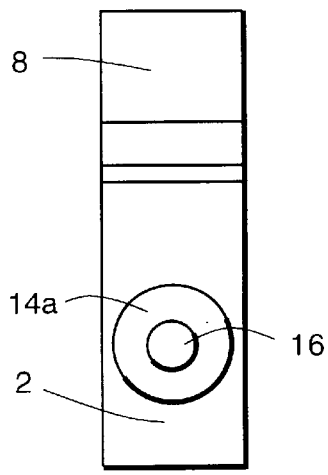
FIG. 1C is a side view of the bottom clip of FIG. 1A from the opposite side.
Figure 2A:
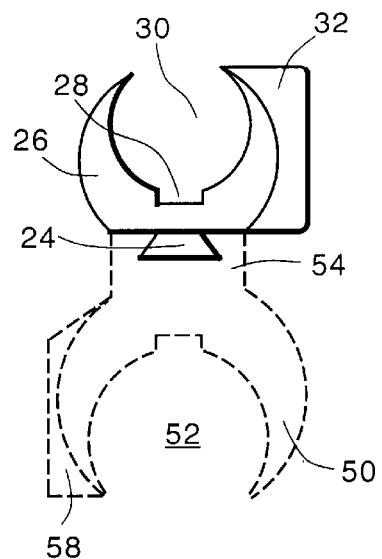
FIG. 2A is a front view of the front section of a rod connection device indicating the location of the rear section during side by side placement of the pole segments.
Figure 2B:
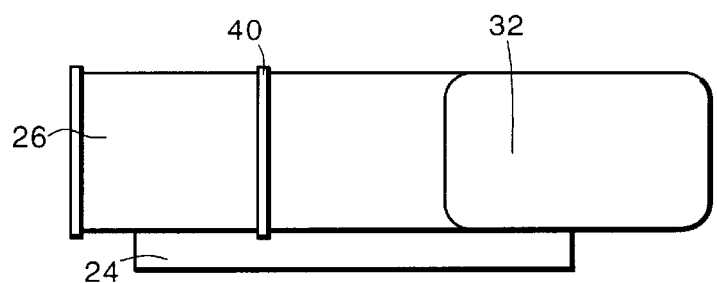
FIG. 2B is a first side view of the front section of FIG. 2A.
Figure 2C:
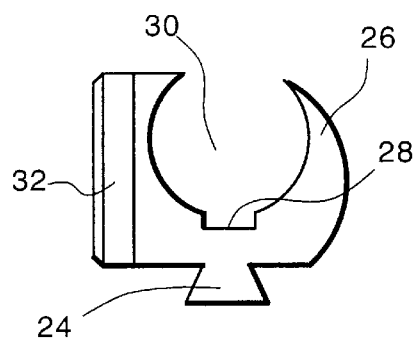
FIG. 2C is a rear view of the front section of FIG. 2A.
Figure 2D:
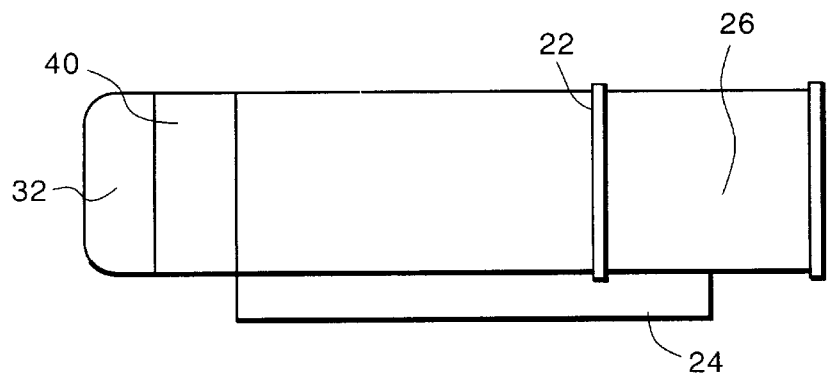
FIG. 2D is an opposite side view of the front section of FIG. 2A.
Figure 3A:
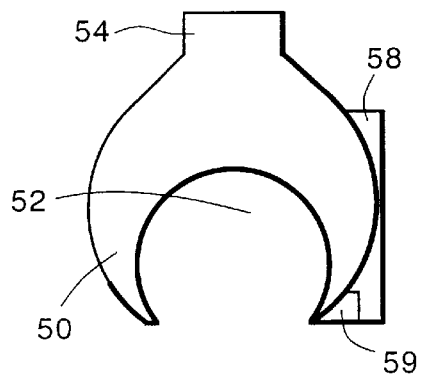
FIG. 3A is a front view of the rear section of a rod connection device.
Figure 3B:
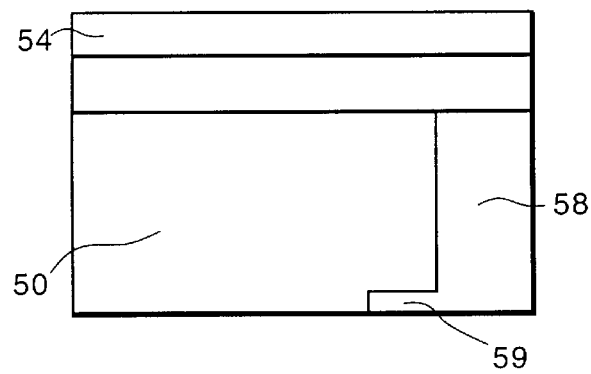
FIG. 3B is a side view of the rear section of a rod connection device.
Figure 3C:
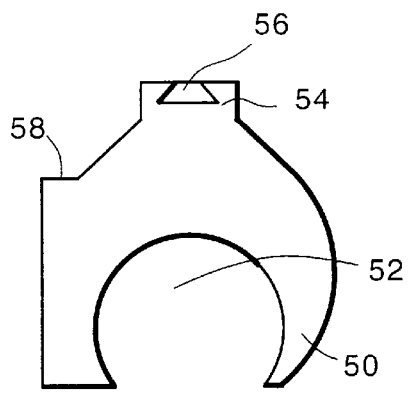
FIG. 3C is a rear view of the rear section of a rod connection device.
Figure 3D:
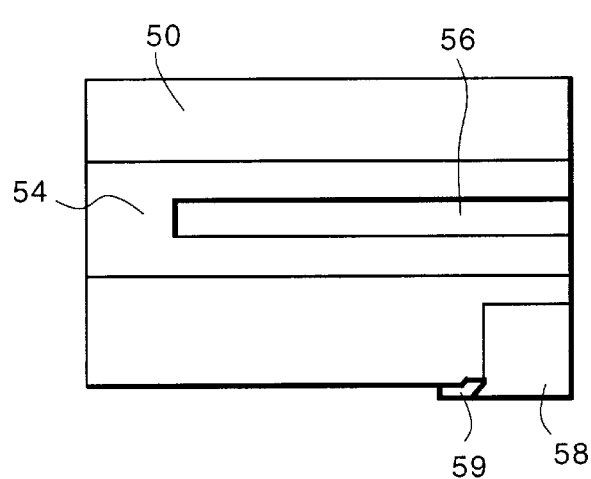
FIG. 3D is a top view of the rear section of a rod connection device.

FIGS. 1A through 1C show a bottom clip which can be securely attached to a sectional tapered pole such as a fishing rod just above the handle as shown in FIGS. 4 and 5. The bottom clip has a hooked section (8) with a sightly enlarged tip (6) which holds the tapered rod tip of the disassembled rod securely parallel to the handle when the rod is disassembled for travel or storage. An accessible holder (10) is provided to secure the loose end of the line with the attached tackle such as a fishing hook and/or swivel when the line is not in use. A rod engaging clip (2) holds the rod in a central recess (12). The upper portion of the recess (4) is either flat or indented to allow for placement of a dual faced adhesive tape. However, if a non-tape adhesive such as is available under the trademark HOUSEHOLD GOOP is used for permanently attaching the device, a recess conforming to the shape of the rod, usually round, allows for better contact. This allows for simple and secure snap-on engagement with added adhesion without bulking. To provide for accommodation of a range of diameters in rods, it is preferred that the clip be made of a material having ample stretch and memory, such as a nylon polymer available under the trade name DELRAN found on sewing machines, has two disks (14A, 14B) between which the line is placed and a tension screw (16). This device maintains a steady tension between the disks and the reel, preventing uneven tension when fishing in moving water which can cause the line to tangle. The tension device can also indicate sudden changes in tension, as when a fish is hooked.

Figure 6:
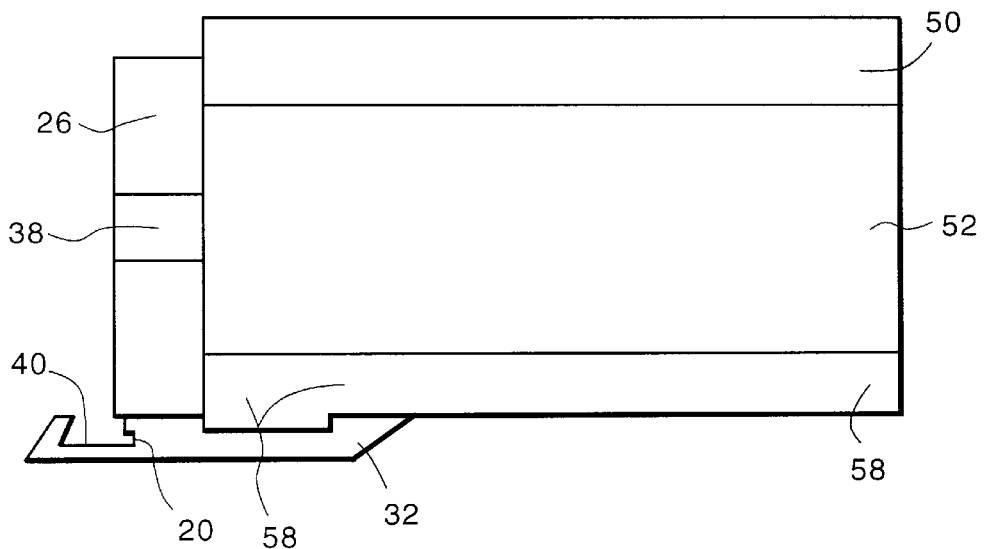
FIG. 6 is a bottom view of the front and rear sections of the rod connector devices when joined in a side by side position.

The front section of the connector device shown in FIGS. 2A to 2D is attached to the bottom end of the tip section of a two piece fishing rod above the connection ferrule by means of a rod clip (26) having a socket (30). A clip arm (32) which engages a projection (50) on the back section of the connector device secures the rod sections together in perfect alignment. The clip arm has an indentation (40) to receive the projection and a notch (20) (see FIG. 6) which can hold and protect the line when the rod is disassembled. An optional area for the placement of tape (29) is shown. At the base of the front section is a dove tail ridge (24), for securing to the rear connector by placement a the matching dove tail groove (56) of the rear section of the connector device.

The rear section of the connector device which is shown in FIGS. 3A to 3D is attached to the bottom section of a two piece fishing rod at the ferrule connection by means of a rod clip (50) having a socket (52). A projection (58) on the clip (50) is engaged by the clip arm (32) on the front section of thus connector device. The projection is provided with an optional stop (59) to insure alignment of the line rings.

Any of the clips can be increased in strength and/or flexibility by providing ribs (22) on the grasping means and/or thinning the walls of such means. Also the clips and clip arm (32) can be provided with a releasing aid such as a projection upon which the thumb of the hand can be applied for pressure.

To allow for the tapering common to fishing rods, the size of the openings for attachment to the rod is as follows: the bottom clip engagement means (2) is dimensionally greater than the grooved rear connector section engagement means (50) which is larger than the front connector section engagement means (26) which is dimensionally larger than the tip engaging hook (8) of the bottom clip.

Directions for installation and use of the above clips its presented from directions developed for the device as follows:

It is advised that the user assemble the rod connection kit without adhesive first to check for fit. Should any part not fit, the rod should be measured and a kit suitable to that size pole should be used instead.

Step 1: Assemble the two piece rod (104, 106) checking for final alignment.

Step 2: Hold the bottom clip A above the rod piece (104) with the eye (10) on the same side as your reel handle (102) with the hooked end (8) straight up opposite the line guides (108) as shown in FIG. 4. Snap on the base section of the rod (104) next to the rod handle (100). Slide forward and back to obtain a snug fit. Mark the location and remove the clip. Apply adhesive to the inner surface of the large ring (2) and replace the clip at the marked, location.

Step 3: Hold the rear connector section with the open mouth of the channel (56) facing the rod tip with the groove upward on the opposite side of the pole from the line guides (108) as shown. Snap the open cylinder onto the rod (104) aligning the edge with the edge of the ferrule.

The ferrule should be flush or very slightly (up to 2 mm) recessed in the cylinder. If a snug fit is not obtained, measure your rod (104) as indicated above for a correct size. Remove the grooved connector section, apply adhesive to the inner surface of the open cylinder (52) and snap the part back in the same position.

Step 4: Hold the front section of the connector with the arm (32) pointed away from the rod tip (see FIG. 4), and the ridge (24) upward on the opposite side of the line guides (108). Butting the ends of the front and rear sections as shown in FIG. 4, snap open the cylinder (26) in to the tip section of the rod (106). The arm (32) should engage the projection (58) of the rear section. If it does not fit, check to see that no ferrule is projecting and for proper alignment. Mark the position. Disengage the tip end of the rod (106) by twisting to disengage the arm (32) and projection (58) parts. Separate the pole sections. Remove the ridged front section from the rod section (106) and apply adhesive to the inner surface of the open cylinder (30). Replace the ridged front section onto the rod (106) following the marking. Remove any excess adhesive. Let the assembly rest until the adhesive has set—(24 hours for best results).

To assemble the rod, simply roughly align the line guides and push the rod sections together until arm (32) engages; projection (58). Twist the rod sections very gently to align the ridge with the groove. When the arm meets the projection stop, the rod will be in proper alignment.

To disassemble, simply twist the rod tip section ¼ turn away from the stop (59) when holding the rod handle (100). Disconnect the ferrule joint. Invert the tip end of the rod (106) towards the rod handle (100). Insert the ridge of the front section into the groove of the rear section. Catch the rod tip under hook (8) of the bottom clip. Guide line into line groove (20) under the clip arm (32). Secure the end of the line to the ring (10) on the bottom clip and take up the slack in the line.

Figure 7A:
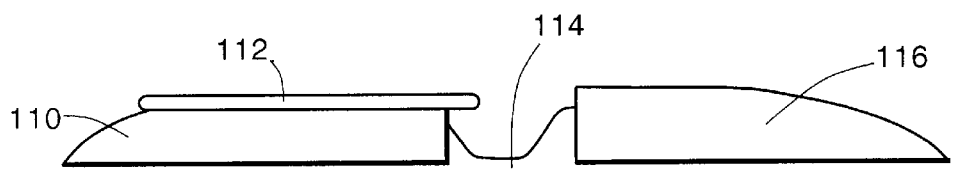
FIG. 7A is a side view of alternative front and rear sections of a rod connector devices.
Figure 7B:
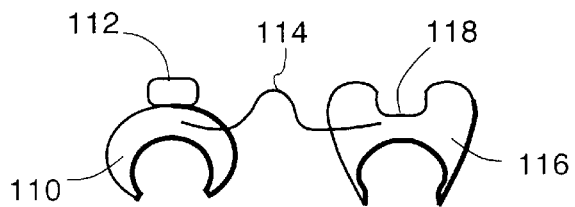
FIG. 7B is a front view of matching faces of the sections of FIG. 7A.
Figure 7C:
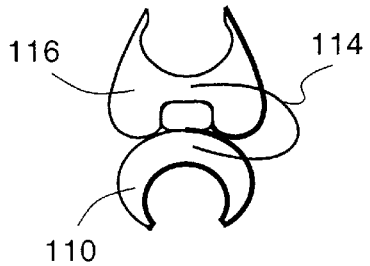
FIG. 7C is a front view of the faces of the sections of FIG. 7B when the sections are interlocked in a side by side position.
Figure 8:
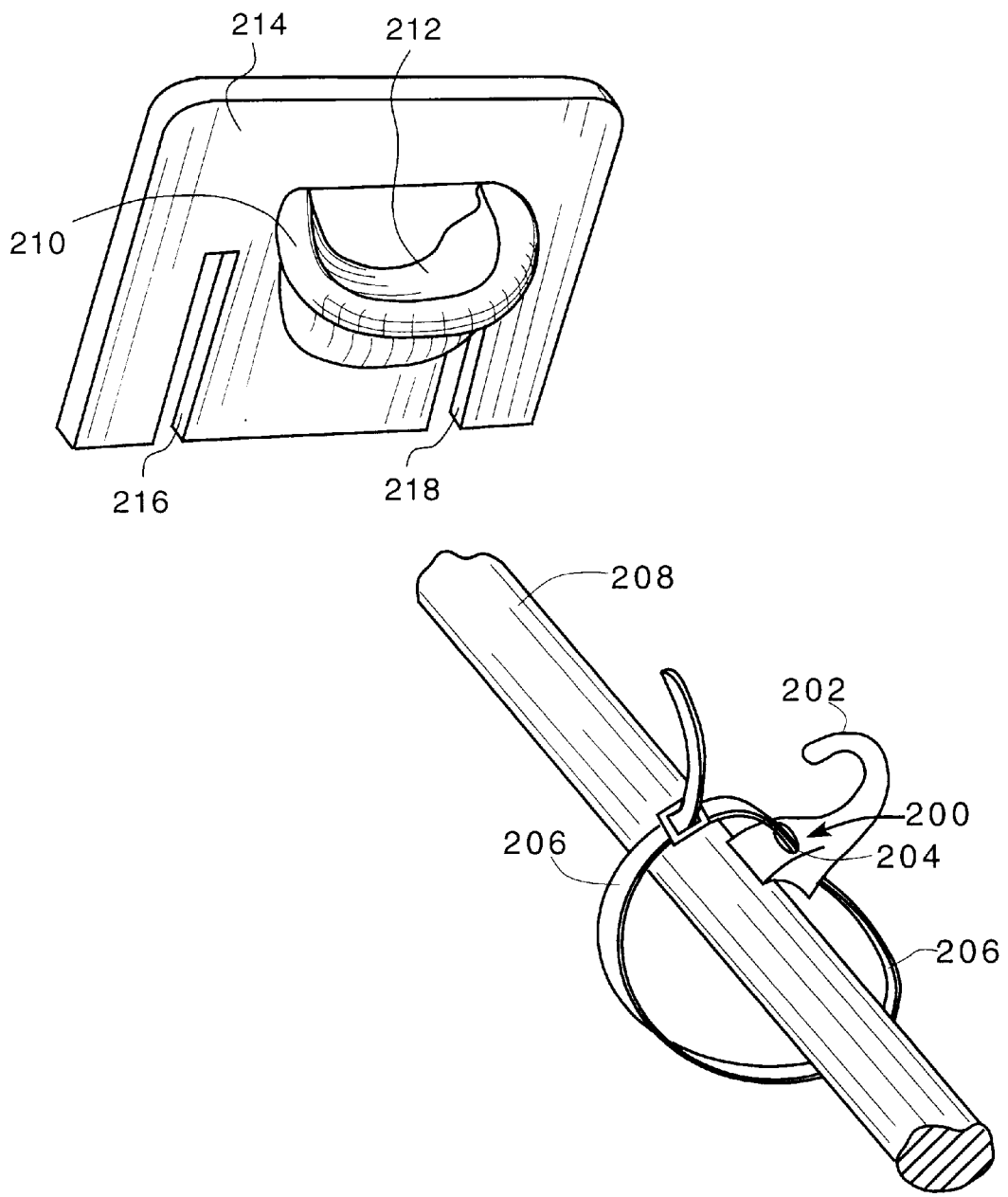
FIG. 8 is an exploded perspective view of a rod retainer system for a rod.

FIGS. 7A to 7C depict an alternate front and rear section. The front section (110) has a ridge (112) which projects beyond the face of the front section. The rear section (116) has a slot (118) which accepts the projecting end of the front section (110) when the pole is assembled, and the rest of the ridge (112) when the pole is disassembled for storage and transport. The sections are connected by a line (114).

In an alternative embodiment, the connectors and clip are manufactured as part of the rod, rather than placing the ends of the rod sections into the recess.

The connector device of the present invention allows this ferrule joint to remain intact and the pole retains its original characteristics.

A simply used retainer system can be used with the connector system. In the preferred embodiment, a body (200) is provided with a hooked upper end (202) similar to that shown in FIG. 1B, and an aperture (204). A locking ribbed closure band (206), similar to those used on plastic bags passes through the aperture and around the pole where it is pulled tight to lock it in position around the pole (208). This rod engagement means (206) can be removed from the pole later if desired by cutting it off. When the rod handler wishes to free their hands for other tasks, The hook (202) is placed over the lip (210) of a molded bowl (212) where it catches over the lip (210) and rests against the wall of the bowl (212). The bowl (212) extends outward from a backing (214) which has two slits (216, 218) which can be slipped over a belt or other flat object such as a storage plate on a wall. Alternately, the backing (214) may be provided with perforations to allow it to be sewn onto a garment or attached by fasteners to a wall.

I claim:

1. A connection device assembly for a sectioned pole having at least a first pole section and a second pole section for interlocking the sections during use and during transport, said connection device assembly including:

(a) a first connection section for mounting to the exterior of the first pole section, said first connection section having a first end, a second end and a side;

(b) a second connection section for mounting to the exterior of the second pole section, said second connection section having a first end, a second end and a side;

(c) a means for securing the first end of the first connection section to the second end of the second connection section, so that the first pole section and the second pole section are connected end-to-end when the first end of the first connection section and the second end of the second connection section are secured and (d) a means for securing the side of the first connection section to the side of the second connection section so that the first pole section and the second pole section are connected side-by-side when the side of the first connection section and the side of the second connection section are secured.

2. The connection device assembly according to claim 1 further including a third connection section having a first and a second means for grasping respectively each of the first pole section and the second pole section, the first grasping means being of a lesser dimension than the second grasping means.

3. The connection device assembly according to claim 2 wherein the third connection section includes a means for securing a line mounted fishing tackle.

4. The connection device assembly according to claim 3 wherein the means for securing a line mounted fishing tackle is an aperture.

5. The connection device assembly according to claim 1 wherein the means for securing the first end of the first connection section to the second end of the second connection section is turnably releasable.

6. The connection device assembly according to claim 5 wherein the material is a nylon.

7. The connection device assembly according to claim 5 wherein the arm includes a line guide.

8. The connection device assembly according to claim 1 wherein the third connection section further includes a line tension device.

9. The connection device assembly according to claim 1 wherein the means for securing the first end of the first connection section to the second end of the second connection section includes grooves and ridges.

10. The connection device assembly according to claim 1 wherein the means for securing the side of the first connection section to the side of the second connection section includes grooves and ridges.

11. The connection device assembly according to claim 1 wherein the means for securing the first end of the first connection section to the second end of the second connection section further includes a pole alignment means.

12. The connection device assembly according to claim 1 wherein the first connection section and the second connection section are made of a material having substantial elasticity and memory.

13. The connection device assembly according to claim 1 wherein the first connection section and the second connection section are provided with ribs.

14. The connection device assembly according to claim 1 wherein the means for securing the first end of the first connection section to the second end of the second connection section further includes an arm having a recess on one side of said arm, said arm located on the first connection section and a projection for engaging said recess located on the second connection section.

* * * * *